(12) United States Patent  
Blewett et al.

(10) Patent No.: US 8,813,607 B2
(45) Date of Patent: Aug. 26, 2014

(54) FAIL-SAFE MANUAL ROTATOR COVER

(75) Inventors: Michael R. Blewett, Stillman Valley, IL (US); Keith E. Short, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 322 days.

(21) Appl. No.: 13/163,839

(22) Filed: Jun. 20, 2011

(65) Prior Publication Data

US 2012/0321446 A1 Dec. 20, 2012

(51) Int. Cl.
 *F16H 57/04* (2010.01)
 *F02C 6/00* (2006.01)
 *F03B 11/00* (2006.01)
 *F04D 29/44* (2006.01)

(52) U.S. Cl.
 USPC .......... 74/606 R; 184/6.12; 60/801; 415/118; 415/201

(58) Field of Classification Search
 USPC ......... 74/606 A, 606 R; 184/6.12; 137/527.8; 60/39.162, 39.163, 801; 415/118, 415/122.1, 201; 416/170 R; 220/203.01, 220/203.04, 203.05, 203.07, 203.19, 203.22
 See application file for complete search history.

(56) References Cited

U.S. PATENT DOCUMENTS

| | | | |
|---|---|---|---|
| 5,813,829 A * | 9/1998 | Mazzotta | 415/123 |
| 6,142,418 A | 11/2000 | Weber et al. | |
| 6,382,909 B1 * | 5/2002 | Voorhees | 415/124 |
| 7,140,240 B2 | 11/2006 | Gustafson et al. | |
| 7,242,353 B2 | 7/2007 | Hung et al. | |
| 7,495,353 B2 | 2/2009 | Christensen et al. | |
| 7,585,164 B2 * | 9/2009 | Joo et al. | 418/270 |
| 8,096,318 B2 * | 1/2012 | Coscarella | 137/527.8 |
| 8,317,158 B2 * | 11/2012 | Patterson et al. | 251/366 |
| 2010/0189548 A1 | 7/2010 | Richards | |

OTHER PUBLICATIONS

Canadian Office Action dated Sep. 18, 2013 for Application No. 2,779,761 pp. 1-3.

* cited by examiner

*Primary Examiner* — Thomas R Hannon
*Assistant Examiner* — Adam D Rogers
(74) *Attorney, Agent, or Firm* — Cantor Colburn LLP

(57) ABSTRACT

A gearbox includes an outer housing including manual rotation access passage and a manual rotation shaft coupled to a spool of an engine to rotate the engine spool. The gearbox also includes coupled to the outer housing that includes a flapper valve that, in a closed position, prevents a lubricant from escaping from the outer housing via the manual rotation access passage.

9 Claims, 3 Drawing Sheets

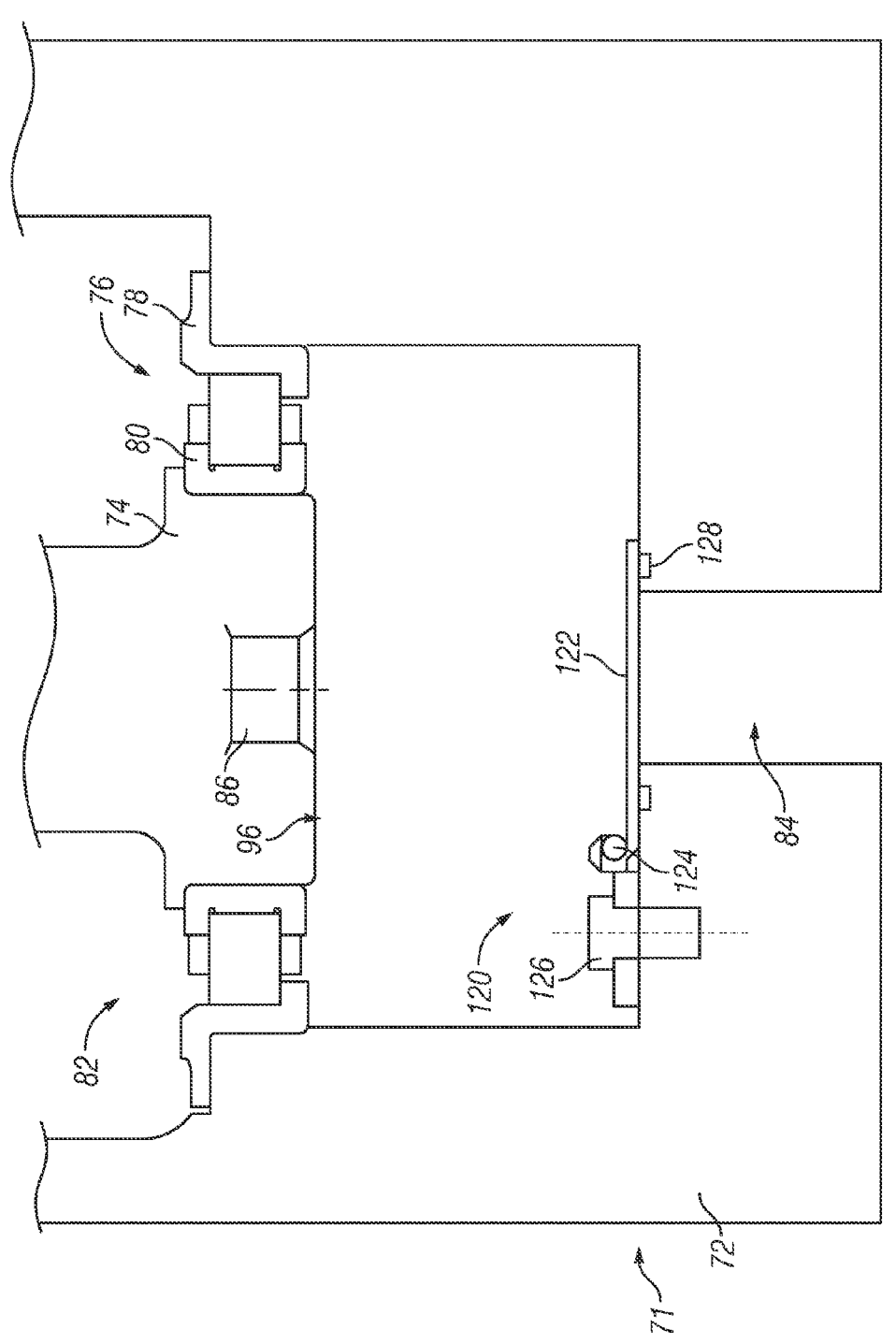

FAIL-SAFE MANUAL ROTATOR COVER

FIELD OF INVENTION

The subject matter disclosed herein relates generally to the field of gearboxes and, in particular, to providing a fail-safe cover for a manual rotator access location in a gearbox.

DESCRIPTION OF RELATED ART

Gas turbine engines often include a mechanically driven accessory gearbox to drive accessory systems such as, but not limited to, power generators, fuel pumps, oil pumps and hydraulic pumps. In general, the gearbox transfers mechanical energy received via a drive shaft coupled to the turbine engine to the accessory systems.

In some instances, the gearbox can also include a manual rotator shaft. Rotation of the manual rotator shaft causes rotation of the engine spool. Such manual rotation can be required, for example, during a maintenance procedure. The manual rotator shaft can be accessed by removing an access cover.

BRIEF SUMMARY

According to one aspect of the invention, a gearbox that includes an outer housing including a manual rotation access passage and a manual rotation shaft having at least a portion thereof located within the outer housing, the manual rotation shaft to manually rotate a spool of an engine. The gearbox of this aspect also includes a sealing system coupled to the outer housing that includes a flapper valve translatable from a closed position to an open position to allow a rotation tool to pass through the manual rotation access passage and contact the manual rotation shaft and translatable from the open position to the closed position after the rotation tool is removed from the manual rotation access passage to prevent a lubricant from escaping from the outer housing via the manual rotation access passage.

According to one aspect of the invention, an engine system that includes an engine having an engine spool and a gearbox is disclosed. The gear box of this aspect includes an outer housing including a manual rotation access passage and a manual rotation shaft having at least a portion thereof located within the outer housing and being coupled to the engine spool such that rotation of the manual rotation shaft causes rotation of the engine spool. The gearbox also includes a sealing system coupled to the outer housing that includes a flapper valve translatable from a closed position to an open position to allow a rotation tool to pass through the manual rotation access passage and contact the manual rotation shaft and translatable from the open position to the closed position after the rotation tool is removed from the manual rotation access passage to prevent a lubricant from escaping from the outer housing via the manual rotation access passage.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES:

FIG. 3 is a cross sectional top view of a gearbox according to another embodiment of the present invention.

DETAILED DESCRIPTION

Figure 1:
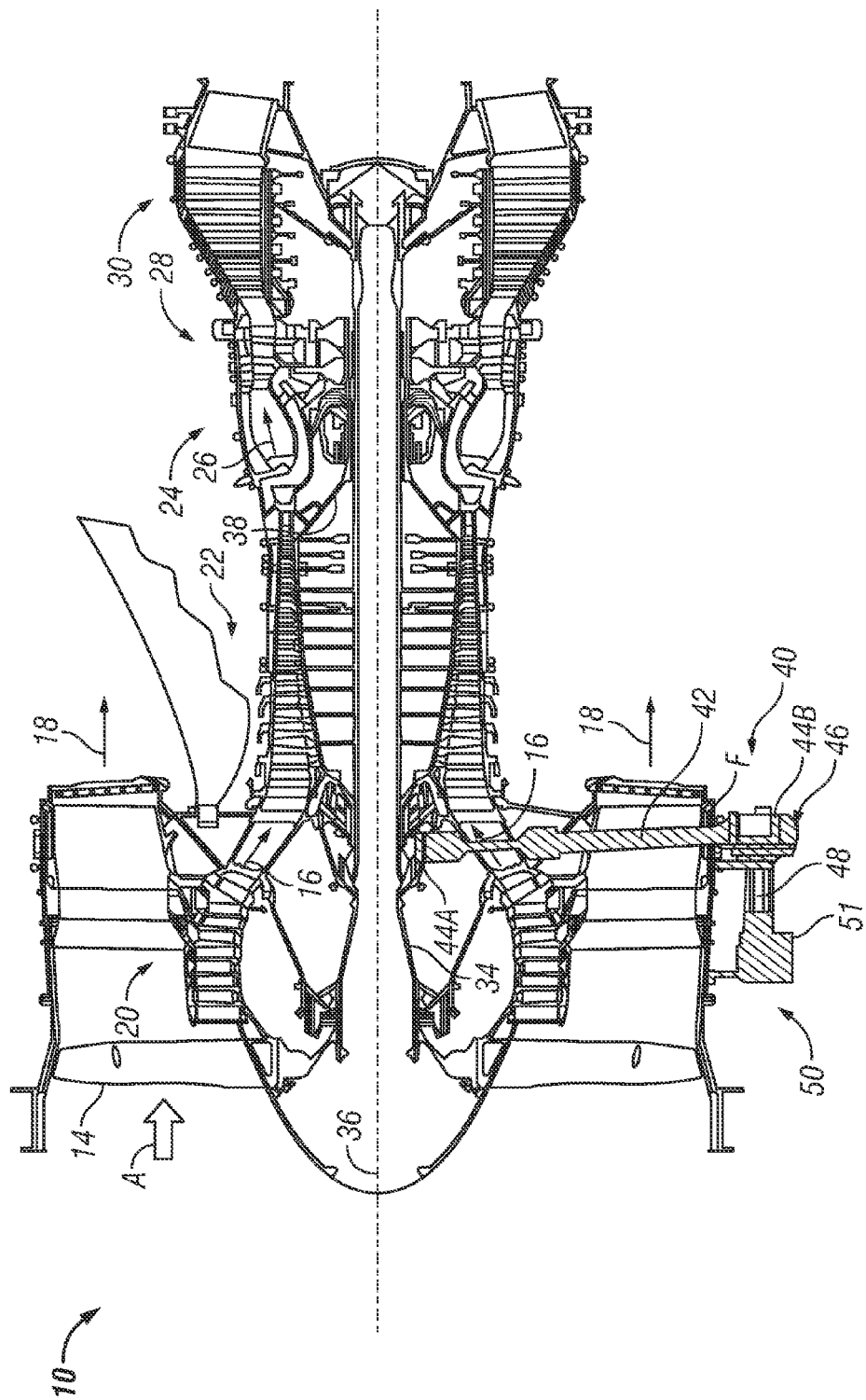
FIG. 1 illustrates a schematic sectional view of a gas turbine engine coupled to a gearbox.

FIG. 1 illustrates a schematic sectional view of a gas turbine engine 10. Air A enters the gas turbine engine 10 via a forward mounted fan 14, where the air A is directed into two discrete streams: core air stream 16 and bypass air 18 stream. The core air stream 16 is pressurized, in series, by a low-pressure compressor 20 and a high-pressure compressor 22, mixed with fuel, and then burned in a combustor 24. The core air 16 stream exits the combustor 24 as exhaust combustion gases 26, which expand, in series, through a high-pressure turbine 28 and a low-pressure turbine 30 before being exhausted from the engine 10. The exhaust combustion gases 26 in combination with the bypass air stream 18 generate forward propulsive thrust.

The low-pressure turbine 30 drives the low-pressure compressor 20 via a low rotor spool 34 revolving about a central, longitudinal axis 36 of the engine 10 while the high-pressure turbine 28 drives the high-pressure compressor 22 via a high rotor spool 38. Although two compressors 20, 22 and two turbines 28, 30 are illustrated in the disclosed non-limiting embodiment, other engine configurations may be provided.

In one non-limiting embodiment, the high rotor spool 38 remotely drives an externally mounted accessory gearbox system 40. A tower shaft 42 engages the high rotor spool 38 proximate the axis 36 through a first bevel gear set 44A and transfers the power radially outward through a second bevel gear set 44B within an angle gearbox 46. The power is then transferred via a lay shaft 48 to an accessory gearbox 50 which contains a gear train 51 to power at least one accessory system. The accessory gearbox 50 may be mounted to an engine frame section F (here illustrated as a fan frame section) for a minimal contribution to engine weight and reduced complexity. It should be understood that various accessory gearbox systems, mount locations and mount coupled to a wing of an aircraft.

Figure 2:
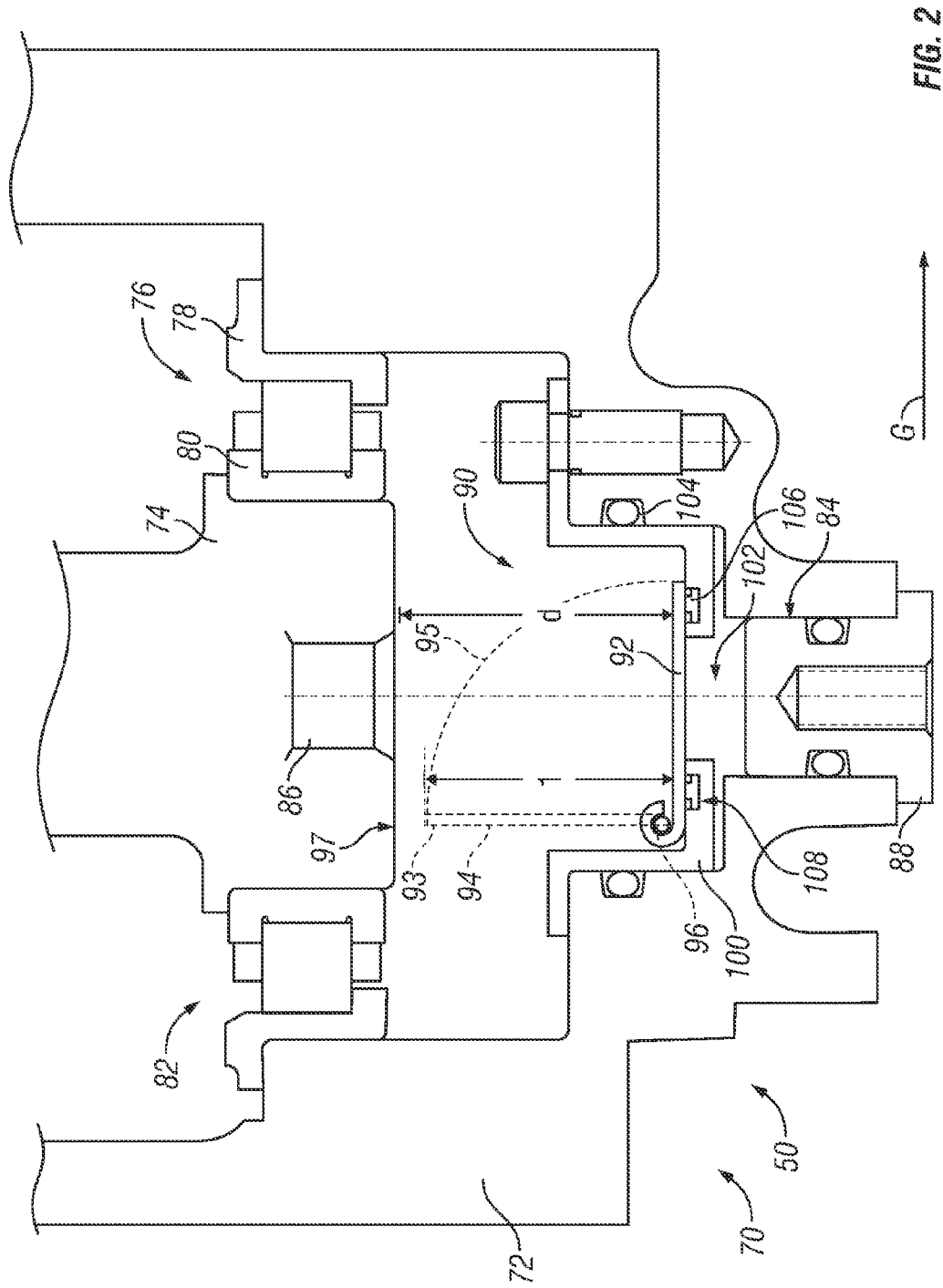
FIG. 2 is a cross sectional top view of a gearbox according to one embodiment of the present invention.

FIG. 2 is cross-sectional top view of a portion 70 of gearbox 50 according to a non-limiting illustrative embodiment. The gear box 50 includes an outer housing 72. The shape and configuration of the outer housing 72 is merely illustrative and can be varied without departing from the scope of the present invention. Generally, the outer housing 72 surrounds end portions of one or more shafts that provide mechanical power to accessory systems of an aircraft. In the illustrated example, the outer housing 72 surrounds at least a portion of a manual rotation shaft 74. In one embodiment, rotation of the manual rotation shaft 74 causes one or both of the low rotor spool 34 and the high rotor spool 38 illustrated in FIG. 1 to rotate.

The manual rotation shaft 74 is illustrated as being rotatably coupled to the outer housing 72 by a bearing 76. The bearing 76 can by any type of bearing. For example, the bearing 76 can be a ball or cylinder bearing. It shall be understood that the bearing 76 need not be directly coupled to the outer housing 72 as illustrated in FIG. 1. For example, an outer bearing component 78 of bearing 76 can be coupled to any element at least partially within the outer housing 72 so long as the outer bearing component 78 does not move relative to the outer housing 72 as the manual rotation shaft 74 is rotated. An inner bearing component 80 is either directly or indirectly coupled to the manual rotation shaft 74.

The outer housing 72 can be configured such that a lubrication reservoir 82 is formed between it and the manual rotation shaft 74. The lubrication reservoir 82 can receive a lubricant and, as in known in the art, is pressurized during operation of the gearbox 50.

The outer housing 72 includes manual rotation access passage 84. This manual rotation access passage 84 is configured and arranged to allow a rotation tool (not shown) to pass through the outer housing 72 and mate with a mating feature 86 formed in the manual rotation shaft 74. The manual rotation access passage 84 is typically filled with a covering such as manual rotator cover 88 when the gearbox 50 is in operation. When manual rotation of the engine spool is required, the manual rotator cover 88 is removed, the tool is inserted such that it engages mating feature 86, and the tool is caused to impart a rotational force on the manual rotation shaft 74 sufficient to cause the engine spool to rotate. When the procedure (e.g., a maintenance procedure) requiring manual rotation is completed, the tool is removed and the rotator cover 88 is typically reinserted in the manual rotation access passage 84.

When the gearbox 50 is in operation, pressurized lubricant in the lubrication reservoir 82 lubricates at least bearing 76. In the event that the manual rotator cover 88 is not replaced, the pressurized lubricant can travel though bearing 76 and leave the outer housing 72 via the manual rotation access passage 84. According to one embodiment, a sealing system 90 is provided within the outer housing 72 that prevents some or all of the lubricant from exiting the outer housing 72 via the manual rotation access passage 84. The sealing system 90 can operate regardless of whether the rotator cover 88 is inserted into the manual rotation access passage 84.

According to the illustrated embodiment, the sealing system 90 includes a flapper valve 92. The flapper valve 92 is arranged and configured such that it can travel between the sealed position illustrated in the FIG. 2 to an open position as indicated by the outline representation of it that is assigned reference numeral 94. It shall be understood that the portion 70 may be arranged such that gravity acts along arrow G.

One or both of pressure from the lubrication reservoir 82 and gravity biases the flapper valve 92 to the illustrated position. In one embodiment, the pressure causes the flapper valve 92 to form a seal lubricant from entering the manual rotation access passage 84. In one embodiment, the flapper valve 92 is located at least a clearance distance d from an end 97 of the manual rotation shaft 74. In one embodiment, the distance d is the same or greater than the length 1 of the flapper valve 92 to allow the flapper valve 92 to transition between the open and closed positions.

The flapper valve 92 rotates about a rotation point defined by a retaining member illustrated as pin 96. Of course, the retaining member could be implemented in other manners than as the illustrated pin 96. In the illustrated embodiment, the sealing system 90 includes a valve housing 100 in which the pin 96 is retained. Of course, in one embodiment, the valve housing 100 could be omitted and the pin 96 retained in the outer housing 72 or in another element contained within the outer housing. As the flapper valve 92 is moved from the closed position to the open position an end 93 thereof traces a path as shown by arc 95. In one embodiment, arc 95 has a radius that is less than the distance d to ensure that the flapper valve 92 can be moved out of the way to allow the rotation tool (not shown) to engage mating feature 86.

In the illustrated embodiment, the valve housing 100 is displaced partially within a valve seat 102 formed in the outer housing 72. The valve housing 100 is secured to the housing 72 by one or more fasteners such as bolt 104. In the illustrated embodiment, lubricant is prevented from entering the manual rotation access passage 84 by traveling between the valve housing 100 and the outer housing 72 by an optional sealing member 104 disposed within the valve seat 102 and surrounding the valve housing 100. The valve housing 100 can also include an optional flap-sealing member 106 disposed in a base region 108 thereof. The sealing member 104 and the flap-sealing member 106 can be formed, for example, of a supple sealing material such as rubber. In one embodiment, the sealing member 104 and the flap-sealing member 106 are rubber o-rings or rubber washers.

FIG. 3 is cross-sectional view of a portion 71 of gearbox 50 according to an alternative non-limiting illustrative embodiment. The portion 71 illustrated in FIG. 3 does not include the valve seat 102. As such, in this embodiment, a sealing system 120 is directly coupled to the outer housing 72. The sealing system 120 includes a flapper valve 122 that rotates about a retaining member such as pin 124 between open and closed positions. The sealing system 120 is be secured to the outer housing 72 by a fastener such as bolt 126. In this embodiment, a flap-sealing member 128 is disposed within the outer housing 72 and serves to create a seal that prevents lubricant from entering manual rotation access passage 84.

It shall be understood that both of the sealing systems 90, 120 illustrated in FIGS. 2 and 3 can optionally include a biasing member that urges the flapper valve 92, 122 from the open position towards the closed position. The biasing member can be a spring in one embodiment. In another embodiment, the sealing systems 90, 120 can optionally include a motion inhibitor that keeps the flapper valve 92, 122 from angularly translating more than 90 degrees from the closed position.

The technical effects and benefits of exemplary embodiments include providing a fail safe that inhibits the loss of lubricant from a gear box in the event that a rotator cover is mistakenly not replaced within a manual rotation access passage.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gearbox comprising:
   an outer housing including a manual rotation access passage;
   a manual rotation shaft having at least a portion thereof located within the outer housing, the manual rotation shaft for manually rotating a spool of an engine;
   a sealing system coupled to the outer housing that includes a flapper valve translatable from a closed position to an open position to allow a rotation tool to pass through the manual rotation access passage and contact the manual rotation shaft and translatable from the open position to the closed position after the rotation tool is removed from the manual rotation access passage to prevent a lubricant from escaping from the outer housing via the manual rotation access passage; and wherein the sealing system includes a valve housing to which the flapper valve is coupled and the valve housing is coupled to the outer housing;

wherein the manual rotation shaft is rotatably coupled to the outer housing by a bearing;

wherein the lubricant is stored in a lubrication reservoir formed by the outer housing and a first side of the bearing and the sealing system is located between a portion of the outer housing and a second side of the bearing that is opposite the first side.

2. The gearbox of claim 1, wherein pressure developed in the lubrication reservoir causes the flapper valve to translate from the open position to the closed position.

3. The gearbox of claim 1, wherein the valve housing is at least partially disposed within a valve seat formed in the outer housing.

4. The gearbox of claim 1, wherein, in the closed position, the flapper valve is located a distance (d) from the manual rotation shaft and has a length (l) that is less than the distance (d).

5. A gearbox comprising:
an outer housing including a manual rotation access passage;
a manual rotation shaft having at least a portion thereof located within the outer housing, the manual rotation shaft to manually rotate a spool of an engine;
a sealing system coupled to the outer housing that includes a flapper valve translatable from a closed position to an open position to allow a rotation tool to pass through the manual rotation access passage and contact the manual rotation shaft and translatable from the open position to the closed position after the rotation tool is removed from the manual rotation access passage to prevent a lubricant from escaping from the outer housing via the manual rotation access passage; and
wherein the sealing system includes a valve housing to which the flapper valve is coupled and the valve housing is coupled to the outer housing;
wherein pressure developed in a lubrication reservoir causes the flapper valve to form a seal with a portion of the valve housing.

6. The gearbox of claim 5, wherein the valve housing includes a base portion having a sealing member disposed therein and wherein the flapper valve forms a seal with the sealing member.

7. An engine system comprising:
an engine that includes an engine spool; and
a gearbox, the gearbox including:
an outer housing including a manual rotation access passage;
a manual rotation shaft having at least a portion thereof located within the outer housing and being coupled to the engine spool such that rotation of the manual rotation shaft causes rotation of the engine spool;
a sealing system coupled to the outer housing that includes a flapper valve translatable from a closed position to an open position to allow a rotation tool to pass through the manual rotation access passage and contact the manual rotation shaft and translatable from the open position to the closed position after the rotation tool is removed from the manual rotation access passage to prevent a lubricant from escaping from the outer housing via the manual rotation access passage;
wherein the sealing system includes a valve housing to which the flapper valve is coupled and the valve housing is coupled to the outer housing;
wherein the manual rotation shaft is rotatably coupled to the outer housing by a bearing; and
wherein the lubricant is stored in a lubrication reservoir formed by the outer housing and a first side of the bearing and the sealing system is located between a portion of the outer housing and a second side of the bearing that is opposite the first side.

8. The engine system of claim 7, wherein the engine is coupled to an aircraft.

9. The engine system of claim 7, wherein the gearbox is coupled to a frame section of the engine.

* * * * *